UNITED STATES PATENT OFFICE.

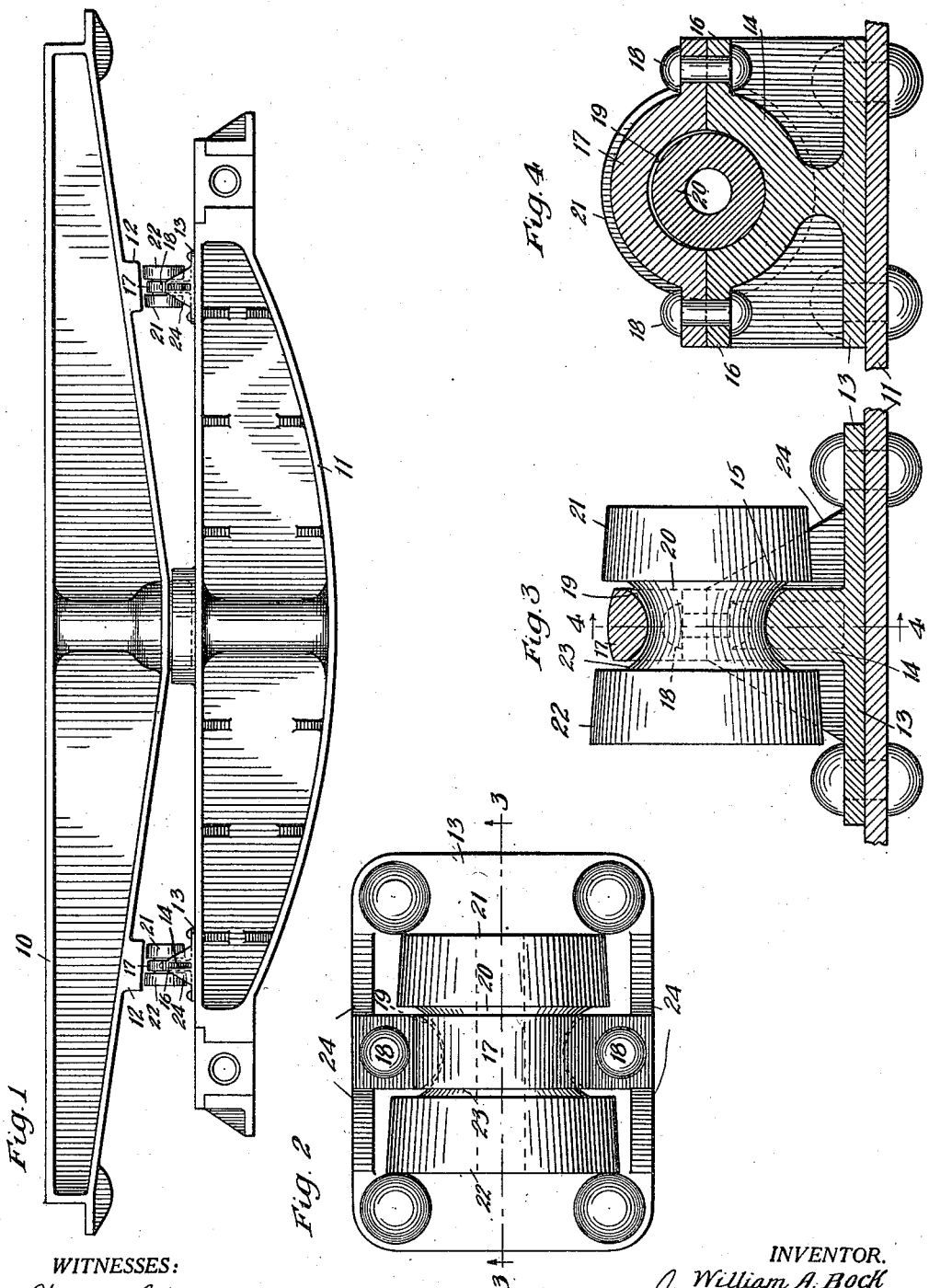

WILLIAM A. BOCK, OF CHICAGO, ILLINOIS, ASSIGNOR TO WILLIAM H. MINER, OF CHAZY, NEW YORK.

SIDE BEARING.

1,153,671.  Specification of Letters Patent.  Patented Sept. 14, 1915.

Application filed June 12, 1914. Serial No. 844,630.

*To all whom it may concern:*

Be it known that I, WILLIAM A. BOCK, a citizen of the United States, residing at Chicago, in the county of Cook and State of Illinois, have invented a certain new and useful Improvement in Side Bearings, of which the following is a full, clear, concise, and exact description, reference being had to the accompanying drawings, forming a part of this specification.

This invention relates to improvements in side bearings for cars.

The object of the invention is to provide an efficient side bearing for railway cars which can be cheaply manufactured.

In the drawing forming a part of this specification, Figure 1 is an end elevation of a car body bolster and truck bolster showing my improvements in connection therewith; Fig. 2 is a top plan view of one form of my improved bearing; Fig. 3 is a sectional view taken substantially on line 3—3 of Fig. 2; and Fig. 4 is a transverse vertical section taken substantially on line 4—4 of Fig. 3.

In said drawing the body bolster is designated by the reference 10 and the truck bolster by the reference 11, and the same may be of any usual or well-known construction. The body bolster is provided with projections 12 which serve as bearing plates for the anti-friction rollers of the side bearings proper.

Referring now to Figs. 2, 3 and 4, my improved side bearing is shown as comprising a base plate 13 riveted or otherwise rigidly secured to the truck bolster, said plate having extended upwardly therefrom a member 14 which is provided on its upper face with half of a bearing, the upper face being convexly curved as indicated at 15. At its upper portion, said member is provided with laterally extended flanges 16 to which an upper member 17 is secured as by rivets 18. The upper member 17 forms the other half of the journal bearing, which also is provided with a convex inner surface 19, so that the opening formed between the members 14 and 17 presents a curved bearing surface for the journal or axle 20 of the rollers 21 and 22. As shown most clearly in Fig. 3, the rollers 21 and 22 each constitutes a frustum of a cone, the apex of which lies within the axis of the king-pin uniting the body and truck bolsters. The rollers 21 and 22 are preferably formed integrally with the journal or axle 20, and the said journal 20 is provided with an annular concave surface 23, the radius of curvature of said concave journal surface being longer than the radius of the convex curved surfaces forming the journal bearing. The smallest section of the journal 20 is somewhat smaller than the minimum diameter of the journal bearing. With this arrangement, the rollers 21 and 22 are permitted an oscillatory movement within the journal bearing so that the rollers can readily accommodate themselves to the various relative positions of the truck bolster and body bolster. In order to properly brace the journal bearing, flanges 24 are provided at each end of the base plate 13.

I have herein shown and described what I now consider the preferred embodiment of my improvements, but I do not wish to be limited by the specific description herein given, but contemplate all such changes and variations as come within the claims appended hereto.

I claim:

1. A side bearing for cars comprising a member adapted to be secured to a bolster and having a journal bearing, the face of said bearing being curved transversely, rollers disposed on opposite sides of said journal bearing member and a journal by which said rollers are carried, said journal being mounted within said journal bearing and oscillatable with respect thereto.

2. A side bearing for cars comprising a member having a journal bearing, the surface of which is convex, rollers disposed on opposite sides of said journal bearing member, and a journal by which said rollers are carried, the said journal being mounted in said bearing and oscillatable relatively thereto.

3. A side bearing for cars comprising a member having a journal bearing therein, rollers on opposite sides of said journal bearing member, and a journal by which said rollers are carried, said journal being mounted in said bearing and provided with a concave surface.

4. A side bearing for cars comprising a member having a journal bearing therein, said bearing being provided with a convex surface, rollers on opposite sides of said journal bearing member, and a journal by which said rollers are carried, said journal being provided with a concave surface and mounted in said convexly curved bearing.

5. A side bearing for cars comprising a base plate having a member extended therefrom, said member having a journal bearing formed therein, said bearing having a convex surface, and a roller carrying journal mounted in said bearing, said journal being provided with a concave surface, the radius of which is longer than the radius of curvature of the convex surface of the journal bearing.

6. A side bearing for cars comprising a member having a journal bearing therein, said bearing being provided with a convex surface, rollers arranged on opposite sides of the journal bearing member, each of said rollers constituting a frustum of a cone, and a journal by which said rollers are carried, said journal being mounted in said bearing.

7. A side bearing for cars comprising a member having a journal bearing formed therein, said journal bearing being formed in two parts and having a convex bearing surface, and a journal oscillatably mounted in said bearing, said journal being provided with rollers at the ends thereof and formed integrally therewith.

WILLIAM A. BOCK.

Witnesses:
CARRIE G. RANZ,
ARLINE R. ARNOLD.

Copies of this patent may be obtained for five cents each, by addressing the "Commissioner of Patents, Washington, D. C."